Patented Oct. 26, 1948

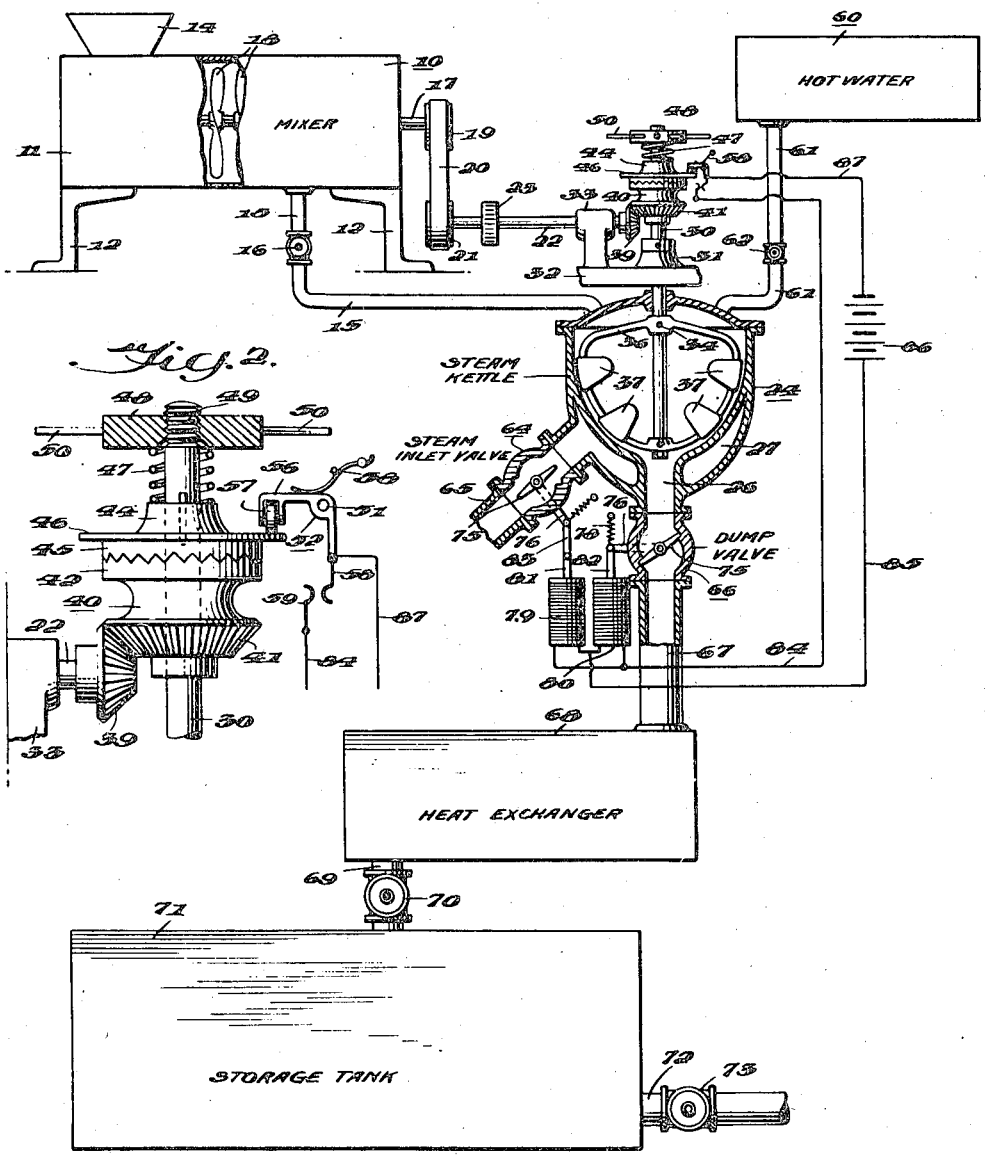

2,452,142

UNITED STATES PATENT OFFICE 2,452,142

VISCOSITY CONTROL

Joseph S. Pecker, Philadelphia, Pa., assignor of one-half to Anne G. Pecker, Philadelphia, Pa.

Application December 23, 1942, Serial No. 469,951

12 Claims. (Cl. 127—28)

1

This invention relates to viscosity control and, in particular, to the provision of means for controlling the viscosity of mixtures which, when stirred in a chamber, thicken or become more viscous, such, for instance, as the cooking of liquid starch mixtures in steam kettles.

It is an object of this invention to provide means directly responsive to the viscosity of a mixture to control the stirring or agitating thereof and its retention in the stirring zone in such manner that the stirring will cease immediately upon the production in the mixture of a predetermined viscosity and the mixture will be discharged from the stirring zone.

It is a further object of this invention to provide such means which is particularly adapted for controlling the agitator of a steam kettle, the admission of heating fluid to heat the heating jacket thereof and the retention of the kettle contents whereby, when a mixture cooked in the kettle reaches a predetermined viscosity, the agitator will become inoperative, the heat will be shut off, and/or the contents will be dumped from the kettle, to prevent overcooking, and the operation is then repeated with a new batch.

These and other objects and advantages will appear from the following description taken in conjunction with the accompanying drawing.

In the drawing:

Fig. 1 is a diagrammatic view of illustrative apparatus embodying the viscosity control means of this invention; and Fig. 2 is an enlarged detail view of the clutch and switch mechanism of the viscosity control means shown in Fig. 1.

Referring to the drawing in detail, the mixer, generally designated 10, comprises a tank 11 supported on legs 12 and provided with a hopper 14 and an outlet pipe 15 controlled by a valve 16. Journalled in the tank 11 is a shaft 17 provided with a plurality of agitator blades or paddles 18 fixed to the shaft 17. The shaft 17 is driven through the pulley 19 which is fixed thereto. The pulley 19 is connected by a belt 20 with a pulley 21 fixed to the shaft 22, which shaft 22 has the main drive pulley 23 fixed thereto by means of which the shafts 17 and 22 may be driven simultaneously by a prime mover drivingly connected to the pulley 23.

The steam kettle is generally designated 24 and comprises a generally hemispherical vessel or container portion 25 with an outlet 26 extending from the lower end thereof and with a heating jacket 27 substantially surrounding the walls of

2 the portion 25, the top of the container portion 25 being covered by the top or lid 28.

Extending through the lid 28 and arranged concentrically of the kettle is the rotor shaft 30, which is journalled at 31 in the frame 32, which also carries a journal 33 for supporting the above-described shaft 22. In the interest of clearness, only a portion of the frame has been shown.

Fixed to the rotor shaft 30 by means of pins 34 and 35 is an agitator comprising a hoop-like supporting member 36 having blades or paddles 37 fixed thereon as shown in the drawing.

The lower clutch member generally designated 40 is freely supported on the upper end of the rotor shaft 30 and comprises a spur gear portion 41 and a clutch jaw portion 42 integral therewith. The gear portion 41 is drivingly connected with the shaft 22 by the spur gear 39 fixed to the end of the shaft 22.

Splined to the rotor shaft 30 above the member 40 is the upper clutch member 44 having at its lower end a clutch jaw portion 45 complementary with the clutch jaw portion 42, above which is disposed a switch operating disk 46.

Disposed above the upper clutch member 44 is a compressor spring 47. This spring 47 is disposed between the upper end of the upper clutch member 44 and the adjusting wheel or nut 48, which is screw threadedly attached at 49 to the rotor shaft 30. This wheel or nut is provided with manually engageable pins 50 by means of which the compression of the spring 47 may be readily and accurately adjusted.

The operation of the clutch mechanism is as follows:

When the shaft 22 is rotated through the pulley 23, rotation of the shaft 22 is transmitted through the spur gear 39 to the lower clutch member 40 through engagement of the teeth of the spur gear 39 with the teeth of the gear portion 41. The rotation of the lower clutch member 40 is transmitted through the clutch portions 42 and 45 to the upper clutch member 44 so long as the clutch portions 42 and 45 are in engagement as shown in Fig. 2. This engagement is dependent upon the compression on the spring 47 and the resistance to rotation of the rotor shaft 30 because when sufficient resistance to rotation of the rotor shaft 30 occurs to overbalance the compressive force of the spring 47 upon the upper clutch member 44, the clutch member 44 will rise upwardly on the shaft 30 to which it is splined, with the result that relative rotation will occur between the lower clutch member 40, which is driven by the shaft 22, and the upper clutch member 44, which is splined to the shaft 30. Thus, adjustment of the compression of the spring 47 through the adjusting wheel or nut 48 determines what degree of resistance to the shaft 30 will permit the overload clutch to operate for disconnection of the power train between the shaft 22 and the rotor shaft 30.

It is to be noted that operation of the overload clutch to disconnect this power train is accompanied by upward movement of the upper clutch member 44 with respect to the rotor shaft 30 and, since the switch operating disk 46 is an integral part of the upper clutch member 44, this switch operating disk will move upwardly when the power train is broken, or opened, upon the occurrence of that degree of resistance to the rotation of the rotor shaft 30 predetermined by adjustment of the spring 47.

Pivotally supported on the pin 51 is the switch member 52 having a substantially vertical switch arm 54 terminating in a contact 55 and a substantially horizontal arm 56 supporting a roller 57, which roller rides upon the switch operating disk 46. The arm 56 is constantly biased downwardly to maintain the roller 57 in engagement with the disk 46 by a biasing spring 58.

Supported in suitable manner adjacent to, but slightly spaced from, the above-described contact 55 is the stationary contact 59.

As will be readily seen from Fig. 2, the switch contacts 55 and 59 are normally separated and the switch formed thereby is normally open. However, when the switch operating disk 46 moves upwardly with respect to the rotor shaft 30 as described above, the switch arm 52 will be moved in clockwise direction about the pin 51 to engage the switch contacts 55 and 59 and close the switch.

Thus, when the power train is opened by operation of the overload clutch, as described above, the switch 55, 59 is closed to complete a circuit, hereinafter described, for a purpose also hereinafter most clearly explained.

As shown in Fig. 1, the outlet pipe 15, controlled by the valve 16, extends from the mixer 10 through the top or cover 28 of the steam kettle 24. Also connected to the interior of the steam kettle 24 is the hot water tank 60 having the pipe 61, controlled by the valve 62, leading from the hot water tank 60 through the top or lid 28 of the steam kettle 24. Thus, when the valve 16 is opened and the contents of the mixer 10 flow through the pipe 15 into the interior of the steam kettle 24, hot water may be added to these contents by opening the valve 62, the valves 16 and 62 being closed when the steam kettle is filled.

Connected with the heating jacket 27 by the steam inlet valve 64 is the steam inlet 65 which leads from a suitable source of steam or other heating medium.

The outlet 26 of the steam kettle 24 is connected by the dump valve 66 with the outlet pipe 67 leading to the heat exchanger 68, the heat exchanger 68 being connected by the pipe 69, controlled by the valve 70, with the storage tank 71 having an outlet 72 controlled by the storage tank outlet valve 73.

As shown in Fig. 1, the steam inlet valve 64 is normally open and the dump valve 66 is normally closed. The valves 64 and 66 are of generally similar construction, being provided with similar rotary gates 75 having arms 76 secured thereto by which they are rotated.

As shown in Fig. 1, the arm 76 of the inlet valve 64 is normally drawn in counterclockwise direction to its open position by the spring 77 while a similar spring 78 normally urges the gate 75 of the dump valve 66 in clockwise direction to its closed or seated position.

Opposed to the springs 77 and 78 are a pair of similar solenoids having coils 79 and 80, respectively, with armatures 81 and 82, the armature 82 being pivoted directly to the valve operating arm 76 of valve 66, and the armature 81 being connected by a link 83 to the arm 76 of the inlet valve 64.

As will be readily understood, when the coils 79 and 80 of the solenoids are de-energized, as is normally the case, the spring 77 maintains the steam inlet valve 64 open, while the spring 78 maintains the dump valve 66 closed. The coils 79 and 80 of the solenoids have common connection with a wire 84 leading from one terminal of each coil directly to the above-described stationary switch contact 59 while the other terminals of the solenoid coils have common connection with a wire 85 leading to one terminal of a source 86 of electric energy, the other terminal of the source 86 being connected by the wire 87 to the above-described switch contact 55 on the switch member 52.

Thus, when the overload clutch 40, 44 operates to interrupt the power train, it also, by placing the switch contacts 55 and 59 in engagement, closes or completes the solenoid energizing circuit to energize the coils and cause the armatures 81 and 82 of the solenoids to be drawn downwardly simultaneously against the springs to close steam inlet valve 64 and open the dump valve 66 simultaneously.

Thus, when a mixture supplied from the mixer 10 and hot water supplied from the hot water tank 60 are subjected in the steam kettle 24 to heating, or cooking, by the steam jacket 27 and to mechanical agitation by the paddles 37 of the agitator rotated by the rotor shaft 30 and when the viscosity of the mixture, or material, in the steam kettle 24 attains a predetermined value controlled by compression in the spring 47, the resistance to rotation of the shaft 30 will be sufficient to cause the overload clutch to open as described above. Thereupon the switch 55, 59 is simultaneously closed to energize the solenoids and simultaneously to close the steam inlet valve 64 and open the dump valve 66 whereby overcooking of the contents of the steam kettle is effectively prevented, the times of rotation of the agitator 36, 37, the supply of heat through the inlet valve 64, and retention of the contents in the steam kettle 24 by the dump valve 66 being thus directly responsive to, and controlled by, viscosity of the contents of the steam kettle 24.

The above-described apparatus is particularly adapted to the production of liquid starch mixtures, such, for instance, as disclosed in Letters Patent No. 2,228,784, granted January 14, 1941, to Simon Spilka.

In the manufacture of such liquid starch mixtures, a mixture of Erkenbrecher starch and cold water is introduced through the hopper 14 into the tank of the mixer 10. After the mixing has proceeded for a sufficient time, the cold mixture is introduced through the pipe 15 under the control of the valve 16 into the chamber 25 of the steam kettle 24. This chamber is heated since the steam inlet valve 64 is normally open. Hot water is introduced from the hot water tank 60 through pipe 61 under the control of the valve 62 in the proportion of approximately three parts of hot water to one part of cold mixture in the chamber 25. The agitator 36, 37 is rotated until the viscosity of the contents of the kettle 24 becomes sufficiently great to overbalance the spring 47 of the overload clutch and cause the clutch to open, which simultaneously causes the switch member 52 to be moved in clockwise direction about the pin 51 to engage contacts 55 and 59 and simultaneously to energize the coils 79 and 80 of the solenoids, which opens the dump valve 66 and closes the steam inlet valve 64 simultaneously with the interruption of the power train rotating the rotor shaft 30 and the attached agitator.

Thus, when the viscosity of the contents of the steam kettle 24 reaches a predetermined value, the power drive of the agitator ceases, the heat is cut off from the steam kettle, and the dump valve 66 is opened to dump the contents of the kettle into the heat exchanger 68, thus effectively preventing overcooking. All contents of the kettle are dumped because the pipe 26 is of such size to permit this, as will be understood by those skilled in this art. A new operation may then be started with a new batch of material.

In the heat exchanger 68 the temperature of the mixture is reduced and a suitable dispersant is introduced either before or after the reduction of the temperature. This dispersant may comprise pine oil and wintergreen, as disclosed in the above-mentioned Spilka patent, or any other suitable dispersant.

Thereafter, a bluing, such as Prussian Blue, may be added, and the mixture stored in the storage tank 71 until withdrawn through the pipe 72, under the control of the valve 73, for further processing and, finally, bottling.

It is, of course, to be understood that the above-described structure is merely illustrative and is in no wise limiting. Any suitable types of mechanically operated valves may be substituted for the valves 64 and 66 illustrated, and any overload clutch of the same general type may be substituted for the overload clutch shown in Figs. 1 and 2 of the drawing. Likewise, the mixer, tanks and other controls are merely shown diagrammatically, and the details thereof may vary substantially to meet varying conditions. While the valve 64 is designated the "steam" inlet valve, it is, of course, to be understood that any suitable heating medium may be supplied, such as hot water, for heating the steam kettle 24.

Having thus fully described my invention, what I claim as new and desire to secure by Letters Patent is:

1. In means for controlling the viscosity of mixtures treated in a steam kettle including a chamber for containing said mixtures, in combination, normally operative means for heating said chamber, valve means normally closed and operating to retain said mixtures in said chamber, agitation means in said chamber, a power train for operating said agitation means including an overload clutch responsive to a predetermined degree of resistance to the operation of said agitation means to open said power train and to simultaneously open said valve means and for rendering said heating means inoperative.

2. In means for controlling the viscosity of mixtures treated in a steam kettle comprising a heated chamber and stirring means for stirring mixtures heated in said chamber, in combination, a dump valve normally closed for retaining the mixtures in said heated chamber, and means including an overload clutch connected to said stirring means, responsive to the viscosity of said mixtures for opening said dump valve and dumping the contents of said chamber when the viscosity thereof reaches a predetermined value.

3. The structure defined in claim 2, and means for adjusting said viscosity responsive means for varying the degree of viscosity necessary to cause said dump valve to be opened.

4. In means for controlling the viscosity of mixtures treated in a steam kettle including a chamber for containing said mixtures, in combination, normally operative means for heating said chamber, valve means normally closed and operating to retain said mixtures in said chamber, agitation means in said chamber, a power train for operating said agitation means including an overload clutch responsive to a predetermined degree of resistance to the operation of said agitation means to open said power train and to simultaneously render said heating means inoperative.

5. In means for controlling the viscosity of mixtures treated in a steam kettle including a chamber for containing said mixtures, in combination, normally operative means for heating said chamber, valve means normally closed and operating to retain said mixtures in said chamber, agitation means in said chamber, a power train for operating said agitation means including an overload clutch responsive to a predetermined degree of resistance to the operation of said agitation means to open said power train and to simultaneously render said heating means inoperative, and means for adjusting said overload clutch for varying the viscosity necessary to discontinue operation of the said power train and for rendering said heating means inoperative.

6. In means for controlling the viscosity of mixtures treated in apparatus including a chamber and a rotor shaft having thereon an agitator rotatable in said chamber for stirring the contents thereof, in combination, a power train for rotating said rotor shaft including an overload clutch responsive to a predetermined degree of resistance to rotation of said rotor shaft to open the rotor shaft power train, and a dump valve normally closed to maintain the contents in said chamber, operating means for said dump valve and means connecting said operating means to said overload clutch whereby the operation of said overload clutch to open said rotor shaft power train, causes said valve operating means to open said valve.

7. The combination defined in claim 6, and means for adjusting said overload clutch for varying the viscosity necessary to operate said overload clutch and said dump valve.

8. In means for controlling the viscosity of mixtures treated in a steam kettle comprising a chamber at least partially surrounded by a heating jacket with a power driven rotor shaft having thereon an agitator rotatable in said chamber for stirring the contents of said chamber, in combination, a power train for rotating said rotor shaft including an overload clutch responsive to a predetermined degree of resistance to rotation of said rotor shaft to open said rotor shaft power train, a dump valve normally closed to retain said contents in said chamber, a normally open heating fluid inlet valve controlling the supply of heating fluid to said heating jacket, and means operable by said clutch for opening said dump valve and closing said heating fluid inlet valve simultaneously with opening of the rotor shaft power train, whereby upon production of viscosity in a predetermined degree in the contents of said steam kettle chamber, stirring of said contents by said agitator will cease, heating thereof will cease, and said contents will be dumped from said steam kettle.

9. The combination defined in claim 8, and means for adjusting said overload clutch for varying the degree of viscosity of said contents necessary to cause its operation to open the rotor shaft power train.

10. In means for controlling the viscosity of mixtures cooked in a steam kettle having a chamber with an outlet, a heating jacket with an inlet, and a rotary agitator drive shaft having thereon an agitator rotatable in said chamber, in combination, means for driving said agitator drive shaft including an overload clutch adapted to release said drive shaft from the drive upon the occurrence of a predetermined resistance to the rotation thereof, an inlet valve controlling the supply of heating fluid to said heating jacket, yielding means normally maintaining said inlet valve open, motor means adapted when operative to overbalance said yielding means and close said inlet valve, a dump valve controlling the flow of mixtures from said chamber through said outlet, yielding means normally maintaining said dump valve closed, motor means adapted when operative to overbalance said yielding means and open said dump valve, and means common to both said motor means responsive to operation of said overload clutch in interrupting the agitator drive for causing operation of both said motor means for opening said dump valve and closing said inlet valve simultaneously.

11. In means for controlling the viscosity of mixtures cooked in a steam kettle having a chamber with an outlet, a heating jacket with an inlet, and a rotary agitator drive shaft having thereon an agitator rotatable in said chamber, in combination, means for driving said agitator drive shaft including an adjustable overload clutch adapted to release said drive shaft from the drive upon the occurrence of a predetermined resistance to the rotation thereof, means for adjusting said clutch to vary the degree of resistance to which it is responsive, an inlet valve controlling the supply of heating fluid to said heating jacket, means normally maintaining said inlet valve open, motor means adapted when operative to close said inlet valve, a dump valve controlling the flow of mixtures from said chamber through said outlet, means normally maintaining said dump valve closed, motor means adapted when operative to open said dump valve and means common to both said motor means, responsive to operation of said overload clutch in releasing said drive shaft from the drive for causing operation of both said motor means for opening said dump valve and closing said inlet valve simultaneously to cut off the heat and dump said mixtures.

12. In means for controlling the viscosity of liquid mixtures cooked in a steam kettle having a chamber with an outlet, a heating jacket with an inlet, and a rotary agitator drive shaft having thereon an agitator rotatable in said chamber, in combination, means for driving said agitator drive shaft including an adjustable overload clutch adapted to release said drive shaft from the drive upon the occurrence of a predetermined resistance to the rotation thereof, means for adjusting said clutch to vary the resistance to which it is responsive, an inlet valve controlling the supply of heating fluid to said heating jacket, means normally maintaining said inlet valve open, motor means comprising a solenoid adapted when energized to overbalance said last-named means and close said inlet valve, a dump valve controlling the flow of mixtures from said chamber through said outlet, means normally maintaining said dump valve closed, motor means comprising a solenoid adapted when energized to overbalance said last-named means and open said dump valve and means comprising a solenoid energizing circuit common to both said solenoids including a switch operated by said overload clutch to close said circuit and energize both solenoids simultaneously to open said dump valve and close said inlet valve simultaneously upon operation of said overload clutch to release said agitator drive shaft from the drive.

JOSEPH S. PECKER.

REFERENCES CITED

The following references are of record in the file of this patent:

UNITED STATES PATENTS

| Number | Name | Date |
| --- | --- | --- |
| 1,225,086 | Warner | May 8, 1917 |
| 1,334,395 | Patterson | Mar. 23, 1920 |
| 1,534,091 | Smoot | Apr. 25, 1925 |
| 1,630,714 | Moir | May 31, 1927 |
| 1,715,916 | Halvorsen | June 4, 1929 |
| 1,765,433 | Lavett | June 24, 1930 |
| 1,888,431 | Osbourne | Nov. 22, 1932 |
| 2,171,312 | Meyers | Aug. 29, 1939 |
| 2,325,573 | Thompson | July 27, 1943 |